(12) United States Patent
Kasahara

(10) Patent No.: US 10,391,596 B2
(45) Date of Patent: Aug. 27, 2019

(54) TOOL CHANGING METHOD AND TOOL CHANGER

(71) Applicant: MAKINO MILLING MACHINE CO., LTD., Tokyo (JP)

(72) Inventor: Tadashi Kasahara, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/748,459

(22) PCT Filed: Jul. 29, 2015

(86) PCT No.: PCT/JP2015/071567
§ 371 (c)(1),
(2) Date: Jan. 29, 2018

(87) PCT Pub. No.: WO2017/017825
PCT Pub. Date: Feb. 2, 2017

(65) Prior Publication Data
US 2018/0222002 A1  Aug. 9, 2018

(51) Int. Cl.
*B23Q 3/157* (2006.01)
*B23Q 17/00* (2006.01)
(Continued)

(52) U.S. Cl.
CPC ...... *B23Q 3/15503* (2016.11); *B23Q 3/15513* (2013.01); *B23Q 3/15722* (2016.11);
(Continued)

(58) Field of Classification Search
CPC .. Y10T 483/10; Y10T 483/115; Y10T 483/13; Y10T 483/132; Y10T 483/134;
(Continued)

(56) References Cited

U.S. PATENT DOCUMENTS 5,097,587 A     3/1992  Yasuda
5,404,021 A *   4/1995  Mangano ............... B23B 49/00
                                                  250/559.26
7,899,574 B2 *  3/2011  Ogawa ............... G05B 19/4069
                                                  700/159

FOREIGN PATENT DOCUMENTS

DE    3501533 A1 *  7/1986  ........... B23B 49/001
DE    4238504 A1 *  5/1994  ......... B23Q 11/0007
(Continued)

OTHER PUBLICATIONS

EPO Machine Translation of JP 2010228063 A—Sugiyama, S.; "Tool exchanger apparatus for exchanging tools accommodated in tool magazine and main shaft of machine tool has control apparatus which varies door opening and closing stroke according to tool length or tool diameter"; Oct. 14, 2010.*
(Continued)

*Primary Examiner* — Sunil K Singh
*Assistant Examiner* — Michael J Vitale
(74) *Attorney, Agent, or Firm* — Morrison & Foerster LLP

(57) ABSTRACT

This tool exchange device for a machine tool uses an exchange arm to exchange tools between a processing area and a tool accommodation area which are partitioned by a partition wall provided with an opening and a shutter capable of opening and closing the opening. In the tool exchange device, an imaging device is used to capture an image of a tool in the tool accommodation area, the length of the tool is calculated from the captured image of the tool, the opening width of the shutter is determined in accordance with the length of the tool, and the shutter is opened to the determined opening width.

10 Claims, 12 Drawing Sheets

(51) Int. Cl.
  *B23Q 3/155* (2006.01)
  *B23Q 17/24* (2006.01)
  *B23Q 11/08* (2006.01)

(52) U.S. Cl.
  CPC .......... *B23Q 11/08* (2013.01); *B23Q 17/2409* (2013.01); *B23Q 17/2461* (2013.01); *B23Q 11/0825* (2013.01); *B23Q 2003/1553* (2016.11); *B23Q 2003/155425* (2016.11); *Y10T 483/10* (2015.01); *Y10T 483/115* (2015.01); *Y10T 483/138* (2015.01)

(58) Field of Classification Search
  CPC ............ Y10T 483/136; Y10T 483/138; B23Q 17/0923; B23Q 17/2461
  USPC ................ 483/1, 3, 7, 8, 9, 10, 11; 700/179
  See application file for complete search history.

(56) References Cited

FOREIGN PATENT DOCUMENTS

| | | | | |
|---|---|---|---|---|
| DE | 4431059 A1 | * | 3/1996 | ......... G01B 11/2433 |
| JP | 9-91044 | | 4/1997 | |
| JP | 2004-216526 | | 8/2004 | |
| JP | 2005-288579 | | 10/2005 | |
| JP | 2006284531 A | * | 10/2006 | |
| JP | 2010133735 A | * | 6/2010 | |
| JP | 2010-228063 | | 10/2010 | |
| JP | 2012061570 A | * | 3/2012 | ............ B23Q 17/22 |
| WO | WO-2015/104945 | | 7/2015 | |

OTHER PUBLICATIONS

EPO Machine Translation of JP H09091044 A—Hamamura M.; "Critical speed detection method for e.g. tool, turbine, motor by determining vibrations, centrifugal force and circumferential speed of rotary body based on computed weight and detected size of rotary body"; Apr. 4, 1997.*

EPO Machine Translation of WO 2015104945 A1—Oishi et al.; "Device for detecting tool breakage in a machine tool"; Jul. 16, 2015.*

International Search Report dated Oct. 20, 2015, directed to PCT Application No. PCT/JP2015/071567; 2 pages.

* cited by examiner

TOOL CHANGING METHOD AND TOOL CHANGER

CROSS-REFERENCE TO RELATED APPLICATIONS

This application is a U.S. national phase patent application of International Patent Application No. PCT/JP2015/071567, filed Jul. 29, 2015, the contents of which is hereby incorporated by reference in the present disclosure in its entirety.

FIELD OF THE INVENTION

The invention relates to a tool changing method and a tool changer.

BACKGROUND OF THE INVENTION

Patent Literature 1 describes a tool changer configured to change tools, through an opening in a splashguard which defines a machining space, between a machining tool and a tool magazine disposed outside the machining space, in which the opening/closing stroke of a door provided at the opening depending on the tool lengths or the tool diameters of the tools to be changed.

PATENT PUBLICATIONS

Patent Literature 1: JP-A-2010-228063

BRIEF SUMMARY OF THE INVENTION

According to the tool changer of Patent Literature 1, the opening/closing stroke can be adjusted depending on the tool lengths or tool diameters, whereby enabling to reduce the time required for the tool changing operation. The tool lengths are previously associated with tool numbers and stored in a storage device. Therefore, it should be troublesome to input the tool lengths into the storage device, and if incorrect tool lengths are input, a tool and the door may interferes with each other when changing tools, resulting in damage in the tool and/or the door.

The invention is directed to solve the above problem, and the objective of the invention is to provide a tool changing method and a tool changer, which optimize, in a safe and easy way, the opening width of a door or a shutter for opening and closing an opening, whereby reducing the time required to change tools.

In order to achieve the above described object, according to the invention, a tool changing method for a machine tool configured to change tools by a changing arm between a machining space and a tool storage space, characterized by an image capturing step of capturing an image of a tool with an image capturing device in a took storage space, a calculating step of calculating a length of the tool based on the image captured in the image capturing step, an control parameter determining step of determining an control parameter for the mechanical operation occurring with tool change, based on the length of the tool, and a tool changing step of changing the tools between the machining space and the tool storage space by carrying out the mechanical operation occurring with the tool change based on the control parameter is provided.

Further, according to the invention, a tool changer for a machine tool configured to change tools by a changing arm between a machining space and a tool storage space, characterized by an image capturing device for capturing an image of a tool in a took storage space, a control device configured to calculate a length of the tool based on the image captured in the image capturing device, to determine an control parameter for the mechanical operation occurring with tool change, based on the length of the tool, and to control the mechanical operation occurring with tool change, and a changing arm configured to change the tools between the machining space and the tool storage space is provided.

According to the invention, the operation parameter for the changing arm at the time of tool change by the changing arm is determined based on the image of the tool captured by the image capturing device, and therefore the time required to change the tools can be significantly reduced.

DETAILED DESCRIPTION OF THE INVENTION

Figure 1:
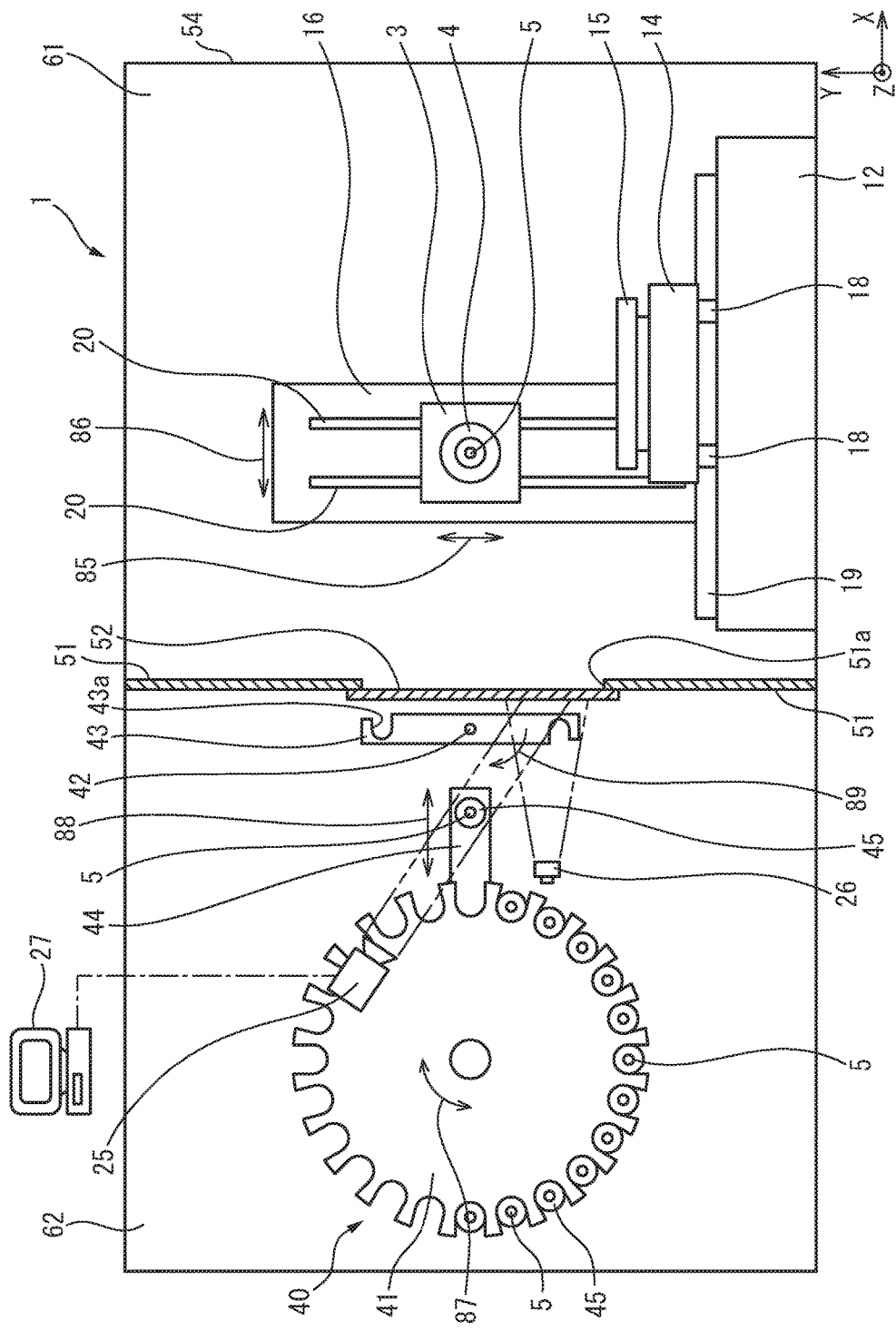
FIG. 1 is a schematic section of a machine tool provided with a tool changer according to a preferred embodiment.
Figure 2:
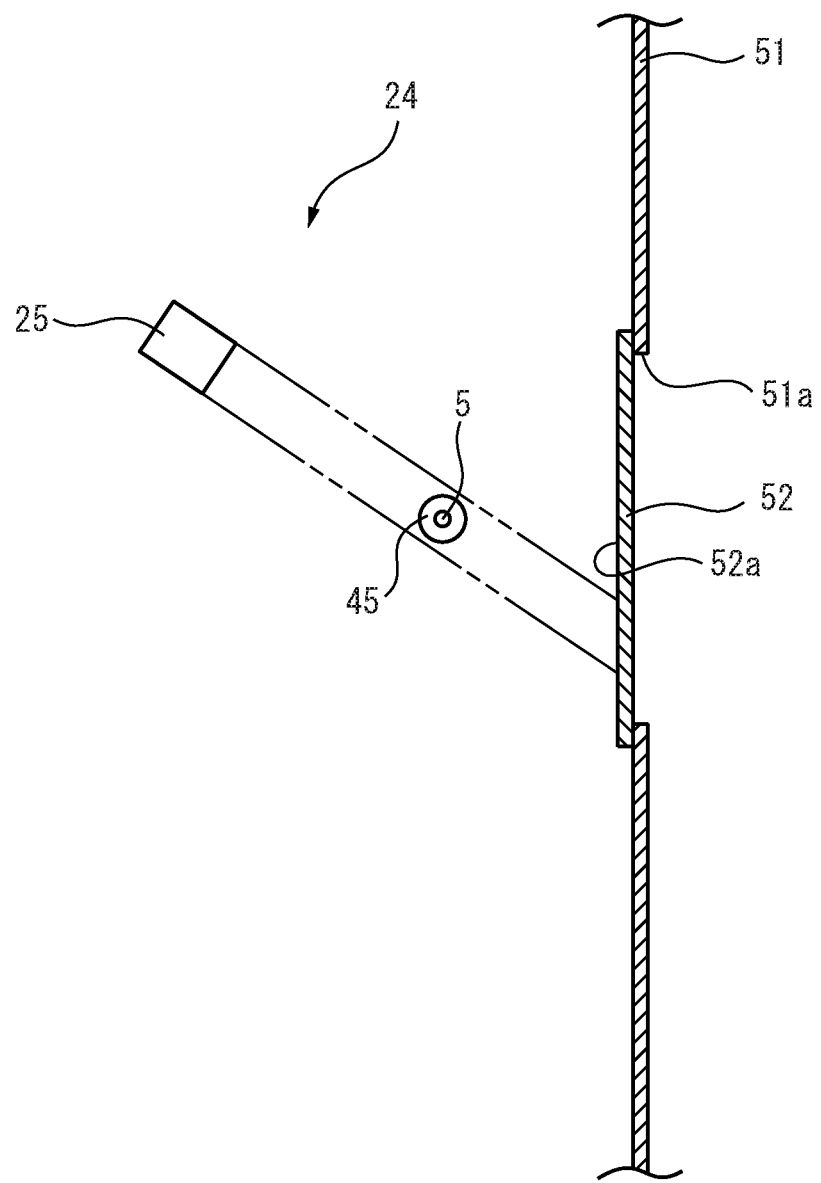
FIG. 2 is a schematic section of an image capturing device.
Figure 3:
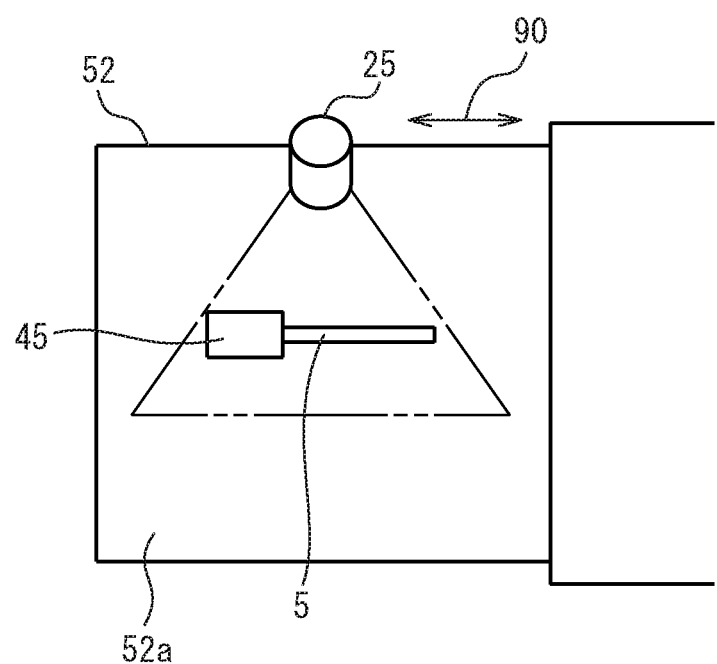
FIG. 3 is a schematic front view of the image capturing device.
Figure 4:
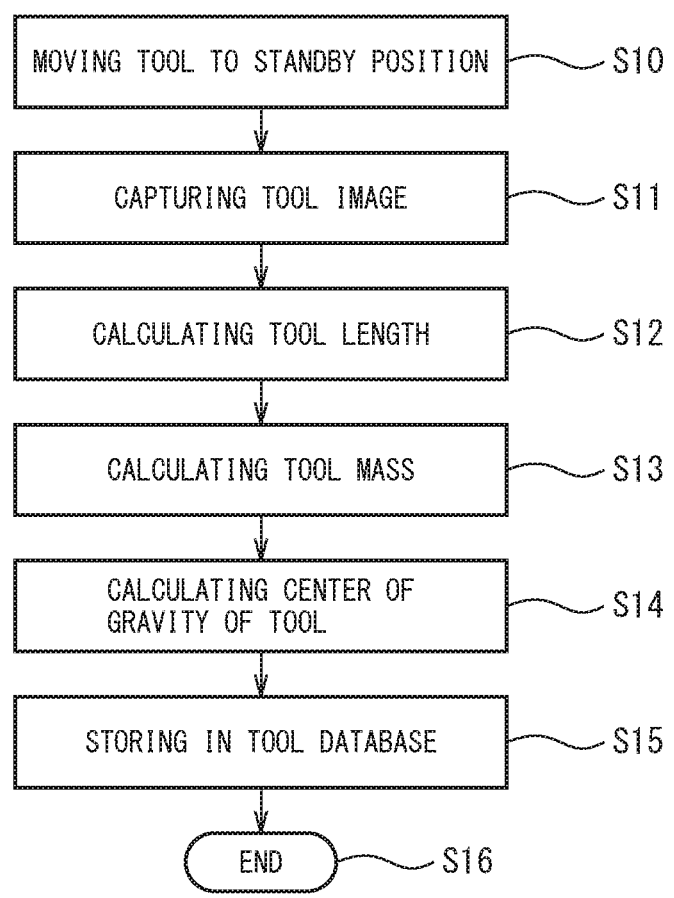
FIG. 4 is a flow chart illustrating a tool measurement operation.

With reference to FIGS. 1-3, a preferred embodiment of the present invention will be described. FIG. 1 is schematic section of a machine tool provided with a tool changer according to a first embodiment. FIG. 2 is a schematic section of an image capturing device provided in the tool changer of FIG. 1. FIG. 3 is a schematic front view of the image capturing device of FIG. 2. In FIGS. 1-3, a tool 5 held by a tool shifter 44 is positioned at a standby position for the tool.

The machine tool 1 is a horizontal machining center in which a tool and a workpiece are automatically moved relative to each other based on a machining program. The machine tool 1 is provided with a feed device configured to move a tool and a workpiece relative to each other. The feed device moves the workpiece in directions of a plurality of moving axes. The plurality of feeding axes include three orthogonal linear feed axes of X-, Y- and Z-axes.

The machine tool 1 includes a bed 12 providing a base. A pair of X-axis guide rails 19 are secured to a top face of the bed 12. A column 16 is disposed on top faces of the X-axis guide rails 19. The column 16 is configured so as to be moved as indicated by an arrow 86 along the X-axis guide rails 19. A pair of Y-axis guide rails 20 are secured to a front face of the column 16. A spindle head 3 is supported on the Y-axis guide rails 20. The spindle head 3 is configured so as to be moved as indicated by an arrow 85 along the Y-axis guide rails 20.

Further, a pair of Z-axis guide rails 18 are secured to the top face of the bed 12. A table 14 is disposed on top faces of the Z-axis guide rails 18. A workpiece is mounted to the table 14 via a pallet 15. The table 14 is configured so as to be moved in the Z-axis direction along the Z-axis guide rails 18.

The spindle head 3 includes a spindle 4 for rotation about a horizontal rotational axis parallel to the Z-axis. A tool 5 for machining the workpiece is attached to the spindle 4. A motor (not shown) for rotationally driving the spindle 4 and the tool 5 is incorporated in the spindle head 3.

In the machine tool 1, the tool 5 is moved in the X- and Y-axes directions, whereas the workpiece is moved in the Z-axis direction. The feed device is not limited to this configuration, and the tool can be moved relative to the workpiece by any type of devices. Further, the machine tool may have a rotary feed axis for rotationally feeding around an axis as well as the liner feed axes.

The machine tool 1 is provided with a tool changer 40 for automatically changing tools. The machine tool 1 has a splashguard 54 defining a machining chamber 61 which provides a machining space in which a workpiece is machined, and a tool storage chamber 62 which provides tool storage space for keeping tools. Further, the machining chamber 61 and tool storage chamber 62 are separated by a partition wall 51. The bed 12, column 16 and spindle head 3, and etc., are disposed in the machining chamber 61. The tool changer 40 is disposed in the tool storage chamber 62. The partition wall 51 defines an opening 51a configured to allow tools to be conveyed between the machining chamber 61 and the tool storage chamber 62. The partition wall 51 is provided with a shutter 62 for opening and closing the opening 51a. The shutter 52 is slidably supported by the partition wall 51.

The machine tool 1 is provided with a motor (not shown) for driving the shutter 52. The shutter 52 is configured to move relative to the partition wall 51. The shutter 52 of the present embodiment is configured so as to move in the Z-axis direction. When the shutter 51 is moved so as to open, a tool 5 can be conveyed through the opening 51a.

The tool changer 40 includes a tool magazine 41 configured to hold a plurality of tools 5, and a conveyer configured to convey a tool between the tool magazine 41 and the spindle 4. The tool magazine 41 of the present embodiment is configured to hold tools 5 via tool holders 45 along a periphery of a base member in the form of a circular plate. The tool magazine 41 is rotated, as indicated by an arrow 87, about a rotating shaft 39 extending parallel to the Z-axis. The conveyer includes a tool shifter 44 and a changing arm 43. The tool shifter 44 is configured to move a tool between the tool magazine 41 and a standby position for the tool. The standby position for the tool is a position where the tool changing arm 43 can hold a tool. The tool shifter 44 is configured to detach a tool 5 from the tool magazine 41 and to attach a tool 5 to the tool magazine 41 by moving in the direction indicated by an arrow 88.

The tool changing arm 43 is formed into a bar shape rotatable around a horizontal rotating shaft 42 as indicated by an arrow 89. The tool changing arm 43 has grippers 43a for holding tools 5 at the either ends thereof. The rotating shaft 42 is coupled to a motor (not shown) for rotating the tool changing arm 43.

The machine tool 1 is provided with a tool image capturing device 24 adapted to measure the shape of the tool by capturing an image of the tool 5. The tool image capturing device 24 includes any type of camera 25 that can perform image processing of the captured image such as a CCD (Charge Coupled Device) camera. The tool image capturing device 24 employs a back light system in which a background of the tool 5 becomes bright while the tool 5 appears dark in the captured image of the tool 5.

The tool image capturing device 24 captures an image of the tool 5 disposed at a predetermined image capturing position inside the tool storage chamber 62. The camera 25 of the present embodiment is disposed so as to capture an image of the tool 5 when the tool 5 is disposed at the standby position. The image capturing position is not limited to the standby position, and may be set to any position. The image capturing device is capable, for example, of photographing the tool immediately after machining has completed. Alternatively, the image capturing device may capture an image of a tool to be used next.

The shutter 52 of the present embodiment functions as a reflector disposed on a side opposite to the camera 25 with respect to the tool in a direction from the camera 25 toward the tool 5 disposed at the standby position. The shutter 52 is disposed behind the tool 5 when viewed from the camera 25. The camera 25 is disposed at a position so that the substantially entire part of the background of the tool 5 in the image is filled with the shutter 52 when the image of the tool 5 is captured at the standby position. The shutter 52 is disposed at the position that intersects a line connecting the camera 25 and the tool 5 disposed at the standby position. The tool 5 is disposed between the shutter 52 and the camera 25.

The shutter 52 includes a reflective surface 52a that reflects light. The reflective surface 52a is formed so as to scatter the light. In the present embodiment, a surface facing inside the tool storage chamber 62 among the area maximum surfaces in which areas are largest in the shutter 52, corresponds to the reflective surface 52a. The reflective surface 52a of the shutter 52 in the present embodiment is coated.

The reflector is not limited to the mode described above, and may be configured so as to scatter at least part of the incident light. In other words, any member can be used as the reflector as long as the member does not have a mirror surface characteristic in which almost all of the entire incident light is reflected in one direction. For example, the reflector may not be coated on a surface thereof, and may have an exposed metallic surface. The reflector may be formed of any material. Any color may be employed when the surface of the reflector is coated. In particular, bright mat coatings such as a bright gray that is used in an inner wall surface of a sheet-metal cover in the machine tool are effective among various coatings.

The tool image capturing device 24 is provided with an illumination device 26 as a light source that irradiates light toward the shutter 52. The illumination device 26 of the present embodiment is an LED (Light Emitting Diode) illumination. The shutter 52 scatters light on the reflective surface 52a, and thus part of the light irradiated by the illumination device 26 proceeds to the camera 25. In this manner, the tool image capturing device 24 of the present embodiment employs an indirect illumination system which illuminates the tool 5 with the reflected diffused reflection light instead of a direct illumination system which directly illuminates the tool 5. The illumination device 26 is disposed so as to capture the image in which the tool becomes darker than the background of the tool with the diffused reflection light that is reflected from the reflective surface 52a of the shutter 52.

The machine tool 1 of the present embodiment includes a control device 27 that controls the machine tool 1. The control device 27 is provided with an arithmetic processing device which includes, for example, a CPU (Central Processing Unit), a RAM (Random Access Memory), and a ROM (Read Only Memory) interconnected to one another via a bus. The control device 27 functions as a control device of the tool image capturing device 24 that analyzes the image that is captured by the image capturing device. The control device 27 controls the image capturing device 24 that captures the image of the tool 5 and the tool exchange device 40.

Images captured by the camera 25 are input to the control device 27. The control device 27, for example, binarizes the input image. The control device 27 measures the number of pixels of a portion corresponding to the tool and a portion corresponding to a portion other than the tool. The control device 27 then calculates the tool length and the tool diameter based on the number of pixels of the portion corresponding to the tool. The control device 27 further calculates the mass and the center of gravity G of the tool 5, including the tool holder 45, based on the calculated tool length and the tool diameter. As described above, the tools 5 are rotating tools, and therefore are rotationally symmetric. Therefore, the tool length, the tool diameter, the mass and the center of gravity G can be easily obtained based on the image captured by the tool image capturing device 24.

The control device 27, for example, causes the illumination device 26 to irradiate for a short time and captures the image of the tool 5. In the present embodiment, a time length of irradiation with light by the illumination device 26 is around 15 ms. The LED illumination that provides a brightness of 1300 lux at a position 1 m apart from the illumination device 26, for example, may be used as the illumination device 26.

With reference to FIG. 2, a projection area may be determined when the tool 5 disposed at the standby position is projected to the shutter 52 from the camera 25. The irradiation area LR that is mainly irradiated with light when the shutter 52 is illuminated by the illumination device 26 may be determined. The irradiation area LR is preferably large enough to include the projection area therein.

According to the present embodiment, in the image captured by the image capturing device 24, a portion corresponding to the tool appears in black as a whole, whereas the background of the tool is brighter due to the diffused reflection light from the reflector. In this manner, the image capturing device captures the image in which the tool is darker than the background of the tool. For example, when the color of light emitted by the illumination device is white, the background of the tool becomes white and the tool appears in black. The control device has an ability to calculate the shape of the tool by using the image.

In the method of directly illuminating the tool, an image of the tool is captured in a state in which the entire part of the tool is bright. However, when the tool is illuminated directly, light may reflect significantly at a part of the tool. Consequently, the part of the tool becomes bright, and the shape of the tool as a whole may be blurred. In contrast, in the backlight system of the present embodiment, the portion corresponds to the tool appears dark. Since a part of the tool does not become bright, the shape of the tool may be measured with a high degree of accuracy.

With reference to FIGS. 1-3, the illumination device 26 preferably includes brightness that makes the image of the entire part of the tool captured by the camera 25 to be black. In other words, the illumination device 26 is preferably a bright light source generating the brightness which makes the entire part of the tool to be black. By adoption this configuration, an image having a clear shape of the tool appears therein may be obtained and the shape of the tool may be measured more accurately.

In addition, the tool capturing device 24 captures an image with the diffused reflection light reflected by the shutter 52. When the machine tool 1 is driven, foreign substances such as fine chips, lubricant supplied to the sliding part, or coolant may be adhered to the reflective surface 52a of the shutter 52. However, the foreign substances such as the fine chips reflect light on the surfaces, and accordingly serve as part of the reflector. Therefore, there is the feature that the foreign substances are hardly captured in the background of the tool. In other words, the tool shape measurement device 24 may reduce the probability that chips, etc., create shadows and black substances come out in the background of the tool. Consequently, accurate measurement of the shape of the tool can be achieved.

In the tool shape measurement device 24, the reflector which reflects light is formed by the shutter 52. The shutter 52 is moved in the direction indicated by an arrow 90 (see FIG. 3) when the tool is exchanged. Even when large-sized foreign substances are adhered to the reflective surface 52a of the shutter 52, the large-sized foreign substances drop off as the shutter 52 moves. Therefore, it is possible to restrain the foreign substances from being captured in the background of the tool in the captured image.

The shutter 52 of the present embodiment extends in a direction that is perpendicular to the reflective surface 52a. In other words, the shutter 52 is supported by the partition wall 51 in an upright state. Therefore, the shutter 52 has a feature that the foreign substances easily drop off due to an action of gravitational force even when the foreign substances are adhered to the reflective surface 52a of the shutter 52. In this manner, the reflector is preferably disposed so that the reflective surface stands upright.

Any illuminations may be employed as the illumination device 26 in addition to the LED illumination. By adopting the LED illumination such as the illumination device 26, brightness may be increased in a short time. Therefore, time that is needed for capturing the image may be shortened. In addition, the LED illumination allows the illumination device to be downsized in comparison with other illumination devices.

The illumination device 26 is preferably disposed at a position where chips, etc., are hardly adhered. For example, the illumination device 26 is preferably disposed so that a back surface faces the tool magazine 41. Alternatively, the illumination device 26 preferably includes a device that removes the foreign substances adhered to the surface that emits light. For example, a device that ejects cleaning liquid onto the surface of the illumination device 26 can be employed as the device that removes the foreign substances. The camera 25 is preferably disposed at a position higher than the image capturing position of the tool 5 when capturing an image. Although there is a probability that the foreign substances adhered to the tool 5 in the machining chamber drop off from the tool 5 in the vicinity of the image capturing position, with the configuration described above, adhesion of the foreign substances onto a surface of a lens of the camera 25 is restricted. The reflector is disposed at a position lower than the image capturing position of the tool 5, so that the image capturing device can capture the image of the tool 5 desirably as described above even when the foreign substances dropped off from the tool 5 are adhered thereto.

With reference to FIGS. 4-18, the operation of tool measurement according to the present embodiment will be described. When the image capture of a tool is started, the magazine 41 is rotated so as to position a tool 5, of which image is to be captured, at a handover position for the shifter 44. Then, the tool 5 is transferred along with the tool holder 45 by the shifter 44 to the standby position providing the image capturing position (Step S10). Then, an image of the side of the tool 5 at the standby position is captured by the camera 25 (Step S11). FIGS. 5-8 illustrate examples of captured images of the tool. Although the images captured by the image capturing device 25 are binary images as described above, the images are shown by line drawings in order to make the illustrations clear. In FIGS. 5-8, a tapping tool (FIG. 5), a drill (FIG. 6), a square end mill (FIG. 7) and a surface mill (FIG. 8) are shown along with the tool holder 45 as examples.

Then, the tool length L of the tool 5 is measured by counting the pixels along the axis O of the tool 5 from reference line R to the end of the tool 5 (Step S12). The reference line R may be defined as an example by a line extending perpendicular to the axis O of the tool through the center of a V-shaped groove 45*a* of the tool holder 45. Further, the diameter of the tool 5 can be measured by counting the pixels in a direction perpendicular to the axis O. The relation between the pixels and the tool length and tool diameter may be previously calibrated by capturing an image of a sample tool of which the precise values of the tool length and tool diameter are known, and storing the relation in the control device 27.

Then, the mass of the tool 5 is calculated (Step S13). In this connection, the mass of the tool holder 45 can be previously actually measured outside the machine tool 1, and stored in the control device 27. As described above, the tool 5 to be measured is a rotating tool, and therefore if the tool length L and the tool diameter D are known, the volume can be calculated, whereby the mass can be calculated with the specific gravity previously stored in the control device 27.

Figure 5:
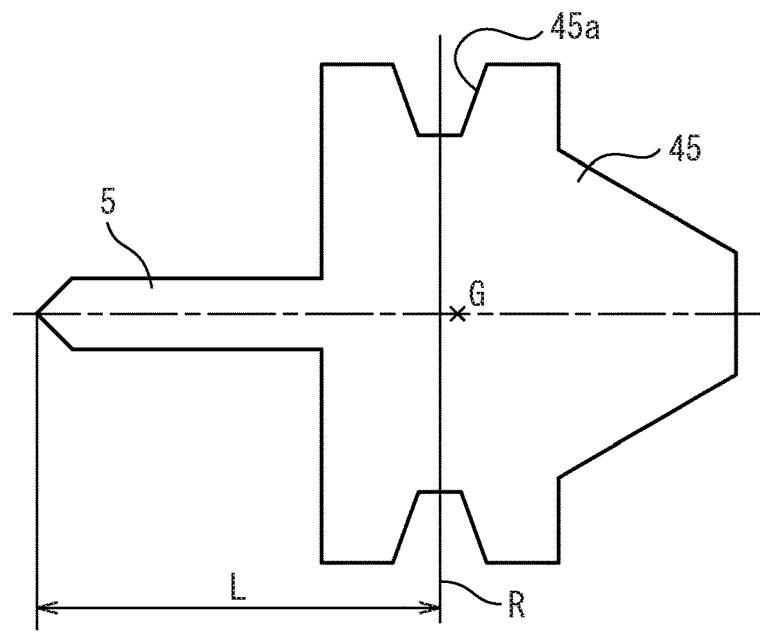
FIG. 5 is a schematic illustration showing an image of a tool (tapping tool) captured by the image capturing device.
Figure 6:
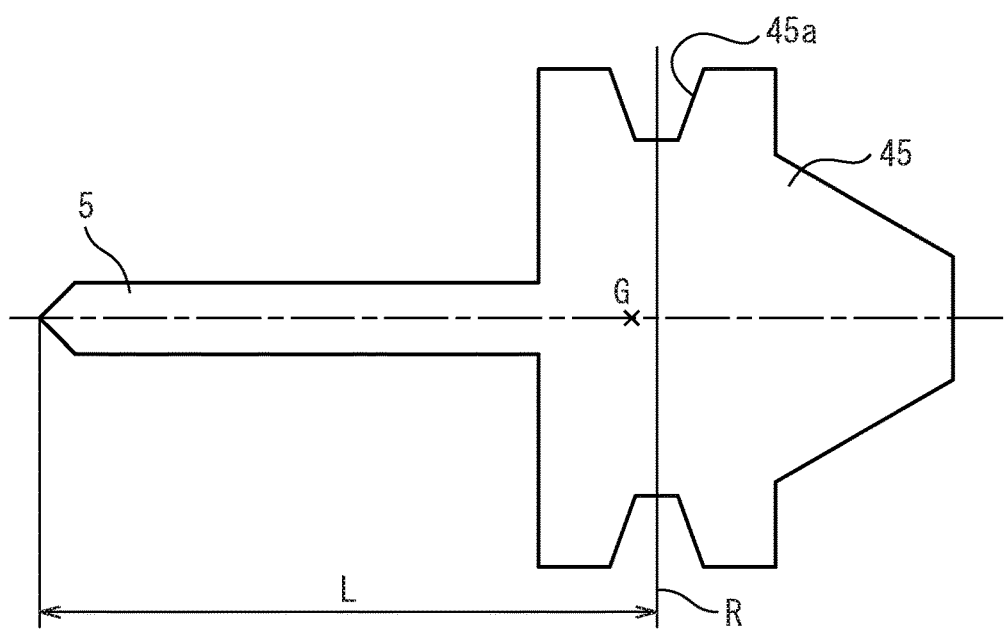
FIG. 6 is a schematic illustration showing an image of a tool (drill) captured by the image capturing device.
Figure 7:
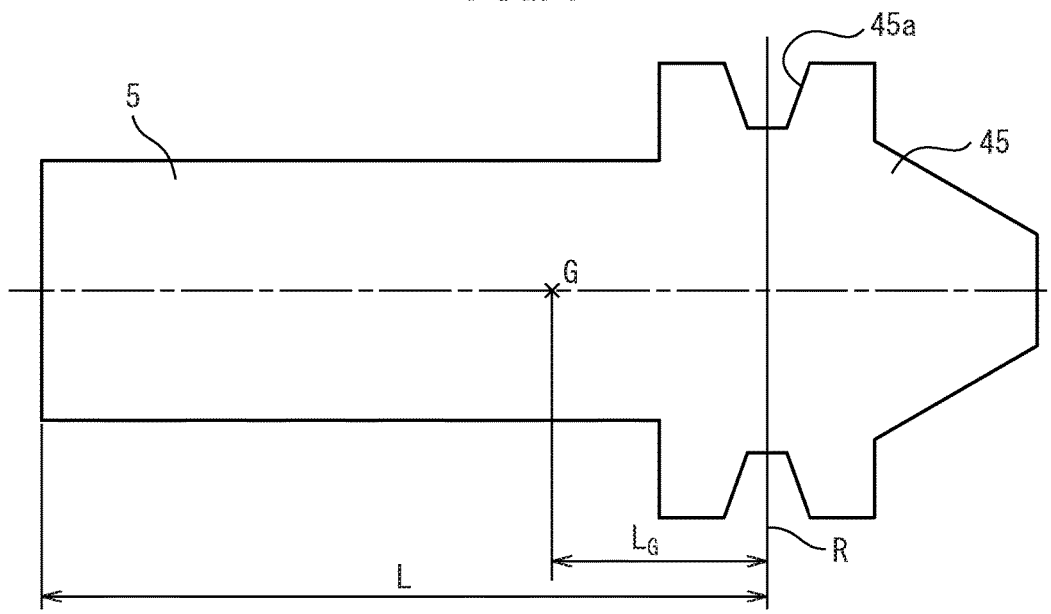
FIG. 7 is a schematic illustration showing an image of a tool (square end mill) captured by the image capturing device.
Figure 8:
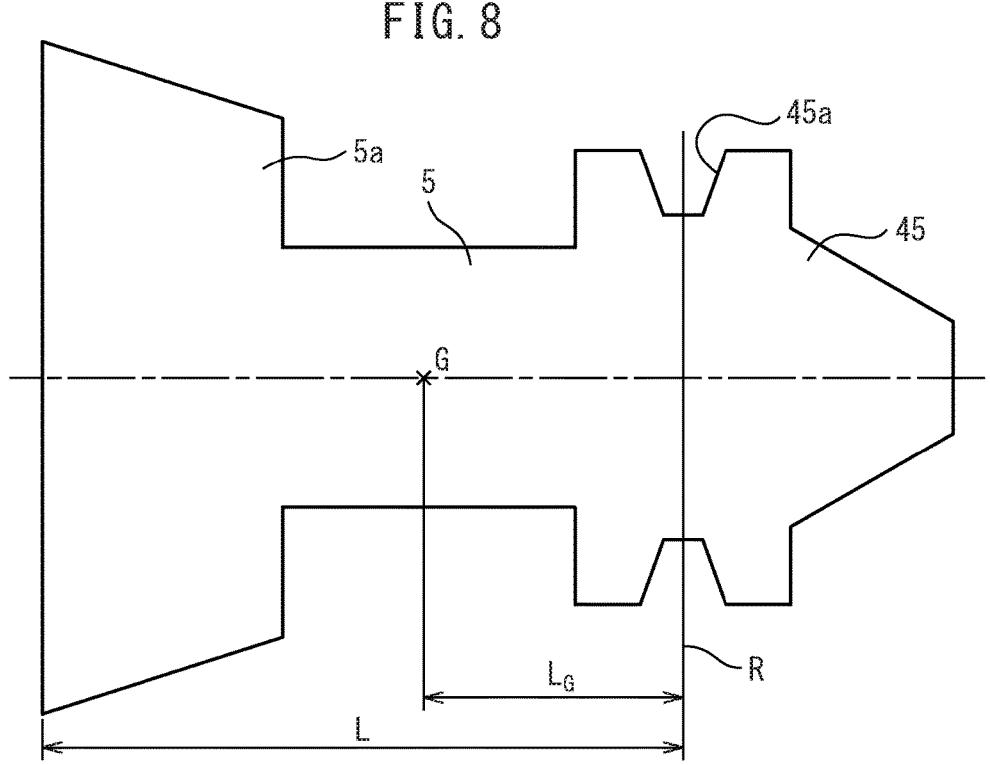
FIG. 8 is a schematic illustration showing an image of a tool (face mill) captured by the image capturing device.
Figure 9:
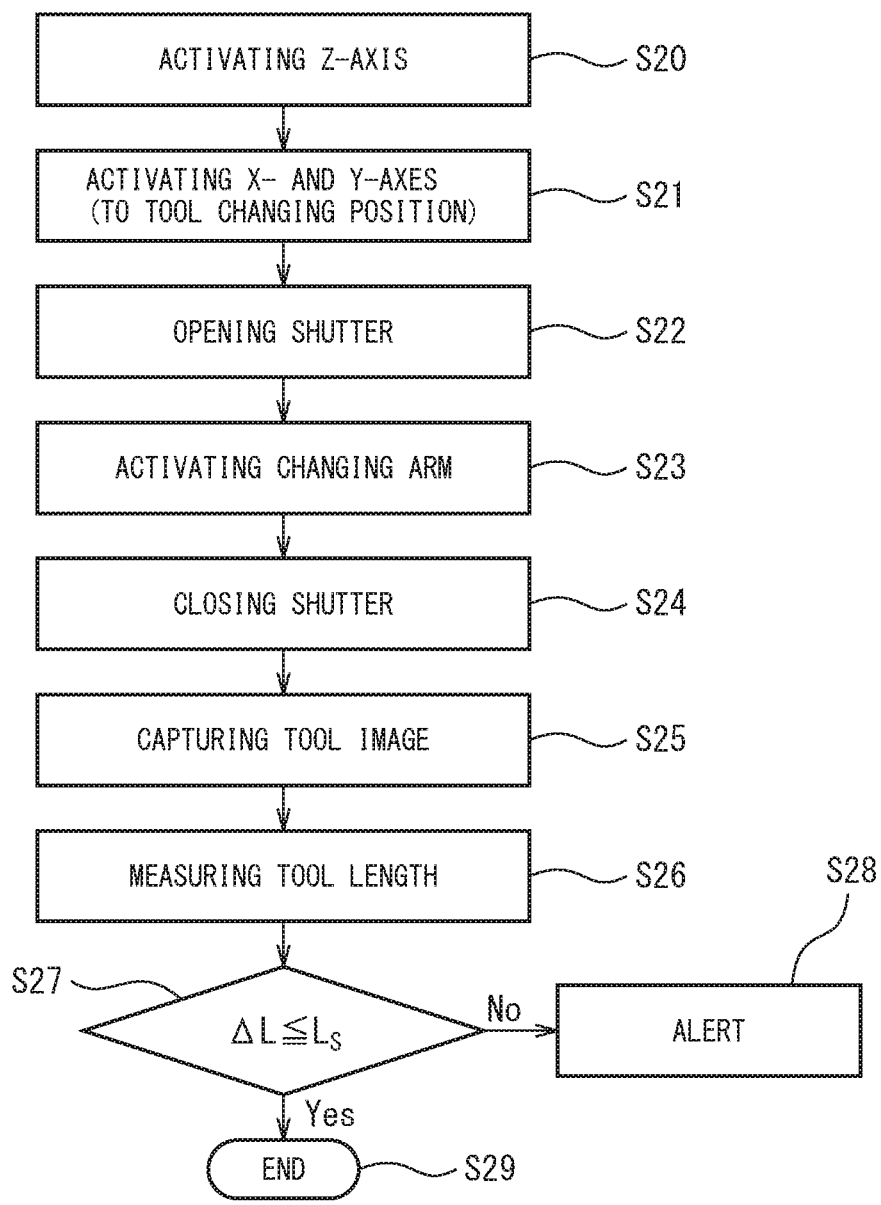
FIG. 9 is a flow chart illustrating a tool changing operation.
Figure 10:
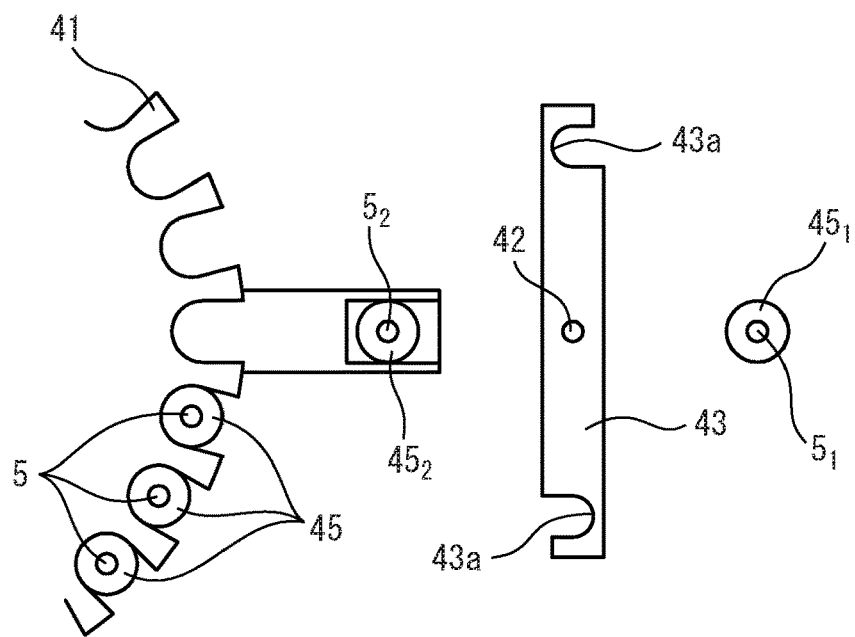
FIG. 10 is a schematic illustration for explaining the operation of the changing arm.

Further, the center of gravity of the tool 5 is calculated (Step S14). As described above, the tool 5 is a rotating tool, and therefore the center of gravity G is on the axis O. Thus, the center of gravity G can be calculated easily by using a widely used program based on the obtained binary image. For example, if the tool 5 is a light weight tool, such as a tapping tool or drill as shown in FIGS. 6 and 5, then the gravity center G is disposed within the tool holder 4, while if the tool is a tool having a long tool length L, such as a square end mill (FIG. 7), or a tool having a heavy head disposed at an end thereof, such as a face mill (FIG. 8), then the center of gravity G is outside the tool holder 45.

The tool length L, the tool diameter D, the mass of the tool, and the position of the center of gravity G thus obtained are stored in a tool database of the control device 27 (Step S15), then the tool measurement is completed (Step S16).

The tool measurement of Steps 10-16 may be carried out for each of the tools 5 sequentially, when the tools 5 are mounted to the tool magazine 41. Alternatively, after all of tools 5 are mounted to the tool magazine 41, the measurement may be carried out for the all tools 5 sequentially, or a tool 5 disposed at the standby position for tool change may be measured.

With reference to FIGS. 9-15, the tool changing operation will be described.

When the tool change is started according to a machining program, the Z-axis linear feed device of the machine tool 1 is actuated (Step S20) to move the spindle head 3 to a position where a workpiece on the table 14, and the tool holder 451 and the tool 51 (FIGS. 10-14) attached to the spindle 4 do not interfere with each other. Then, the X-axis and Y-axis linear feed devices are activated (Step S21) to move the spindle head 3 to a predetermined position for changing the tools 5. The spindle head 3 is moved to a position where the gripper 43*a* can hold the tool 51 attached to the spindle 4 when the changing arm 43 rotated. The used tool 51 (FIGS. 10-14) is attached to the spindle 4. In the tool storage chamber 62, the tool magazine 41 indexes a tool 52 to be used next to a position where the tool shifter 44 can hold it. The tool shifter 44 transfers the tool 52 to be used next to the standby position from the tool magazine 41 along with the tool holder 452. An image of the tool 52 is captured if necessary, and the measurement results of the tool 52 are written in the database. If the tool length etc. are previously input in the database, the measurement is not necessary.

Figure 15:
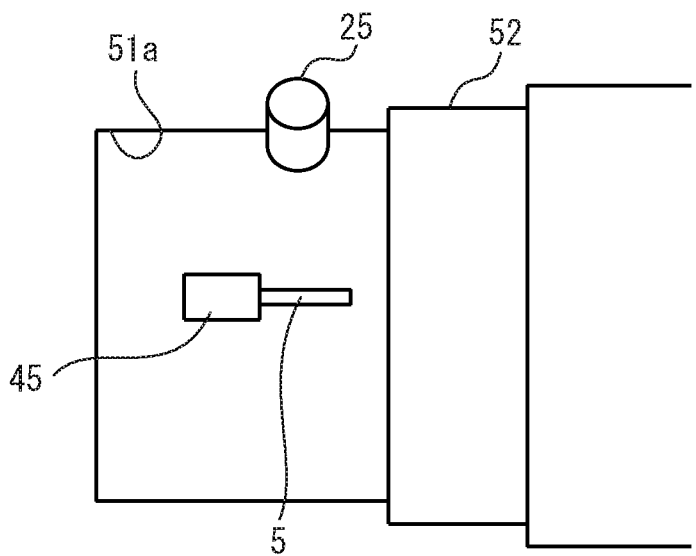
FIG. 15 is a schematic illustration for explaining the operation of the shutter.
Figure 16:
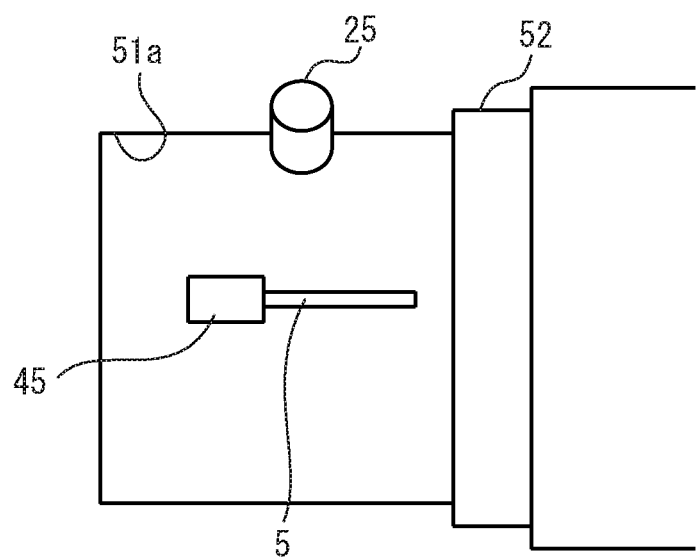
FIG. 16 is a schematic illustration for explaining the operation of the shutter.

Then, the shutter 52 is opened (Step S22). At that time, the control device 27 reads the tool lengths of the tools 51 and 52 to be exchanged from the database to adjust the amount of slide of the shutter 52 so as to prevent the end of the longer tool from interfering the shutter 52. Accordingly, when the tools 51 and 52 are comparatively short as shown in FIG. 15, the amount of slide of the shutter 52 is small, whereas when long as shown in FIG. 16, the amount of slide of the shutter 52 is large. In this way, the time required to open and close the shutter 52 can be minimized by optimizing the amount of slide of the shutter 52, whereby reducing the time required to change the tools. In particular, the amount of slide of the shutter 52 is set by adding to the obtained tool length a predetermined amount of clearance to ensure a space necessary for the tool change operation, whereby minimizing the time for opening and closing.

If the external shapes of the workpiece and the pallet 15 are previously stored in the machine tool, the table 14 is moved in the Z-axis direction away from the spindle 4 so as to prevent the longer one of the tools 51 and 52 from interfering with the workpiece and/or the pallet 15 when the tools are changed. As in the case of the shutter 52, if the tool is comparatively short, then the distance the table 14 is moved away from the spindle 4 is set short, whereas the tool is comparatively long, the distance is set long. If the external shapes of the workpiece and the pallet 15 are not previously stored in the machine tool, the table 14 is moved in the Z-axis direction away from the spindle 4 under assumption that a workpiece and a pallet of allowable maximum sizes are mounted to the table 14 in order to prevent the tools 5 from interfering with the workpiece and/or the pallet 15 when the tools are changed.

Figure 11:
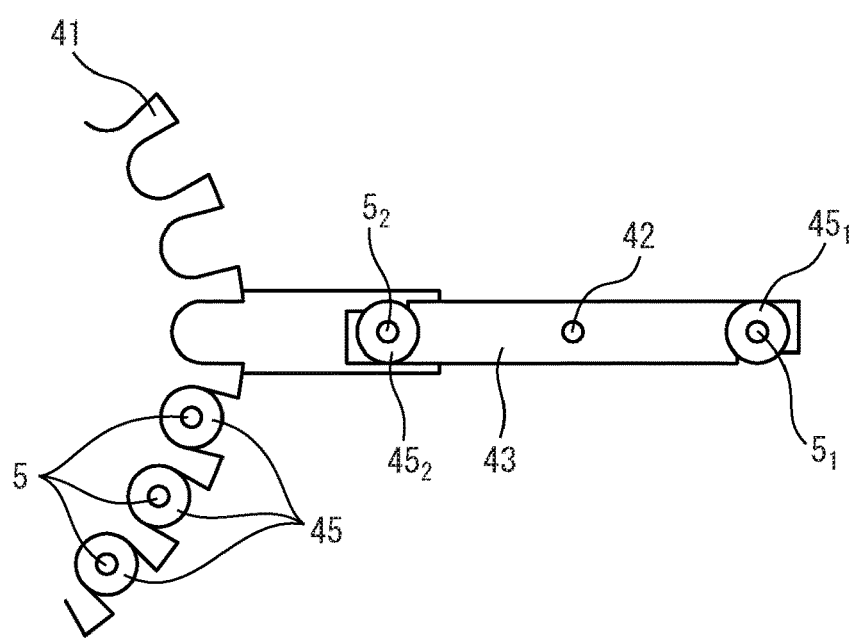
FIG. 11 is a schematic illustration for explaining the operation of the changing arm.
Figure 12:
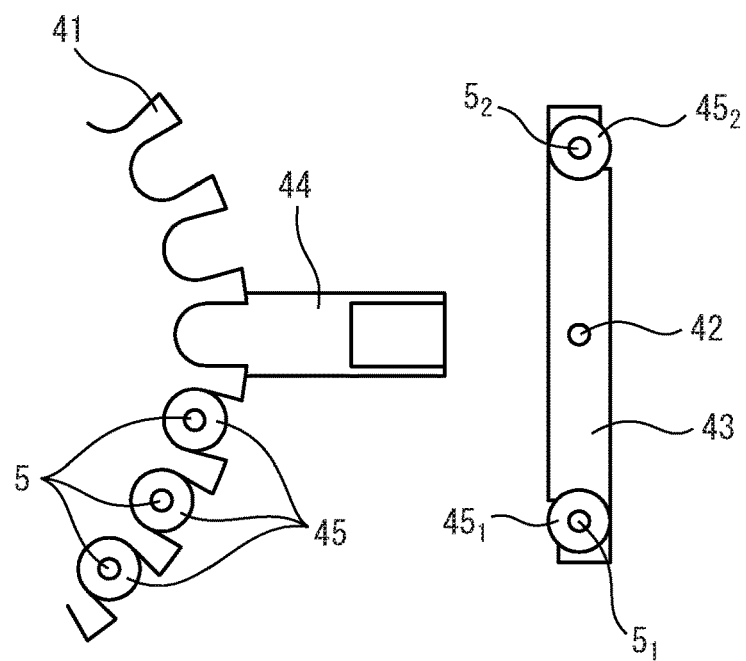
FIG. 12 is a schematic illustration for explaining the operation of the changing arm.
Figure 13:
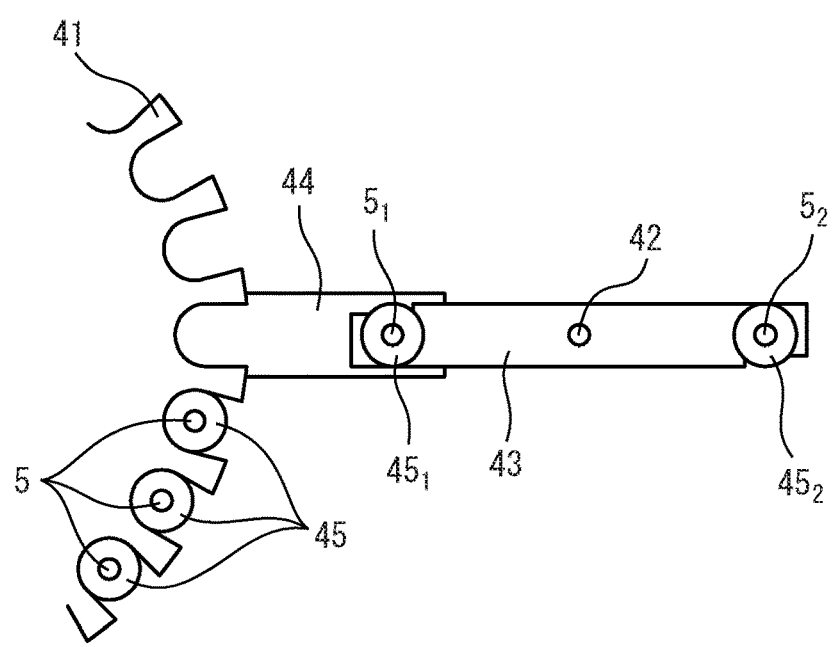
FIG. 13 is a schematic illustration for explaining the operation of the changing arm.
Figure 14:
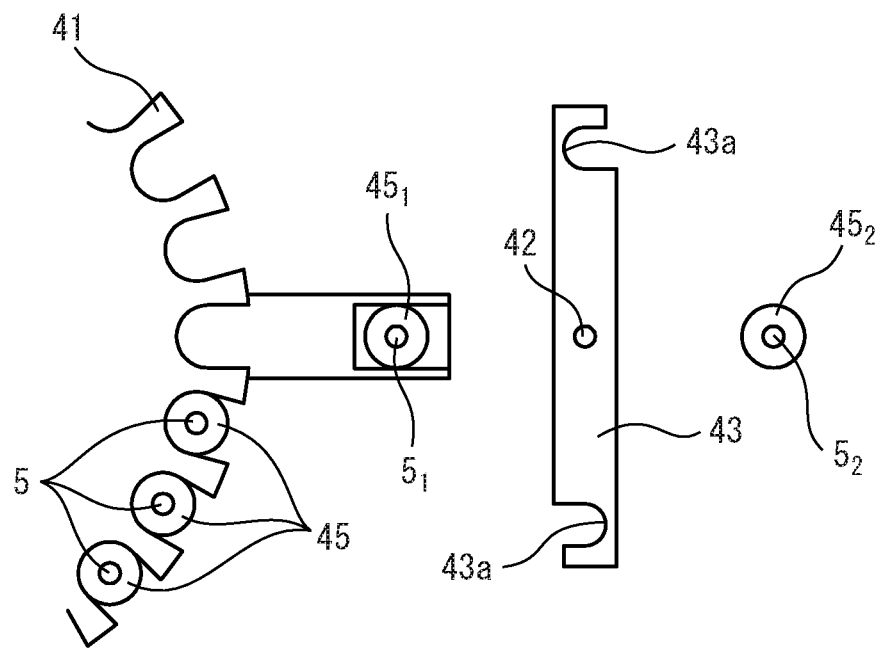
FIG. 14 is a schematic illustration for explaining the operation of the changing arm.

Then, the changing arm 43 operates as described below (Step S23). The changing arm 43 rotates 90 degrees in the clockwise direction in FIGS. 10-14, whereby the grippers 43a simultaneously engage with the respective V-shaped grooves 45a of the tool holder $45_1$ of the tool $5_1$ attached to the spindle 4 and the tool holder $45_2$ of the tool $5_2$ held by the tool shifter 44, whereby holding the tools $5_1$ and $5_2$ (FIG. 11). Then, the rotating shaft 42 of the changing arm 43 is advanced in the Z-axis direction (moved in the proximal direction perpendicular to the planes of FIGS. 1, and 10-14) so that the tool holders $45_1$ and $45_2$ of the tools $5_1$ and $5_2$ are simultaneously detached from the spindle 4 and the tool shifter 44 respectively. After the changing arm 43 further rotates in the clockwise direction (FIGS. 12 and 13), the rotating shaft 42 of the changing arm 43 is retracted in the Z-axis direction (moved in the distal direction perpendicular to the planes of FIGS. 1, and 10-14) so that tool holder $45_2$ of the tool $5_2$ to be used next and the tool holder $45_1$ of the used tool $5_1$ are simultaneously mounted to the spindle 4 and the tool shifter 44. Then, the changing arm 43 rotates in the counter clockwise direction so that the grippers 43a disengage from the V-shaped grooves 45a of the tool holders $45_1$ and $45_2$, and the changing arm 43 returns to the initial position (FIG. 14).

Thereafter, the shutter 52 is closed (Step S24). After the shutter 52 is closed, in the machining chamber, the spindle 4 starts moving to the a next machining position. When the shutter is closed, the used tool $5_1$ is kept along with its tool holder $45_1$ at the standby position as the image capturing position by the tool shifter 44. Then, an image of the used tool 51 is captured by the image capturing device according to the aforementioned method (Step S25) so as to measure its tool length L (Step S26). The control device 27 reads the previously input tool length L of the used tool $5_1$, from the database, compares it with the currently measured tool length L to obtain the difference ΔL therebetween. If ΔL is smaller than a predetermined threshold value Ls, then it is determined that the used tool $5_1$ is not damaged, and the used tool $5_1$ is brought back to the tool magazine 41 by the shifter 44, whereby the tool changing operation is completed (Step S29). Thereafter, the next machining process is initiated. On the other hand, if ΔL is larger than the threshold value Ls, then the control device 27 alerts an operator of the machine tool 1 to the result, and the next machining process is stopped (Step S28). The value obtained by capturing an image of the tool $5_1$ just before it is used is input as the previously input tool length L of the used tool $5_1$.

In the above embodiment, while the damage in the tool is determined by comparing the tool lengths L before and after the machining, tool length L which is previously selected by an operator may be input into the database. In this case, the operator previously inputs the tool length L and the tool mass, which were selected when a machining program was produced, into the database by using an operation panel (not shown) of the machine tool. The values previously input into the database are compared with the tool length L and the mass of the tool obtained by the image capturing process before the machining. If the difference is larger than a threshold value, it is deemed that a wrong tool different from one defined in the machining program is mounted to the tool magazine 41 by an operator, whereby stopping the machining process and alerting an operator to gist of that.

Further, if an operator prepares a tool outside the machine tool, the tool length L may be actually measured by using a tool presetter. The actually measured tool length L is input into the database by using an operation panel of the machine tool to compare with the tool length obtained by image capturing when changing the tools. If the difference is larger than a threshold value, then an alert is generated to notify it.

Figure 17:
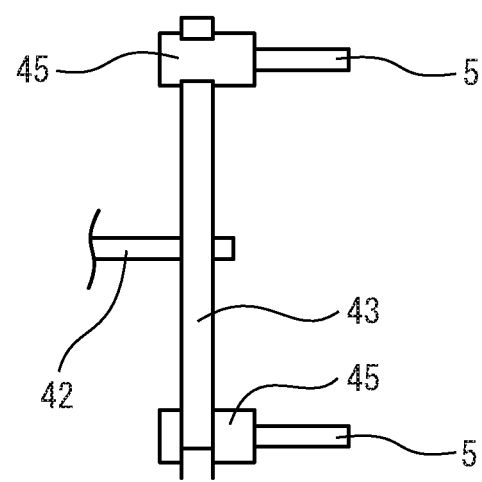
FIG. 17 is a schematic illustration for explaining the rotational moment acting on the tools held by the changing arm.
Figure 18:
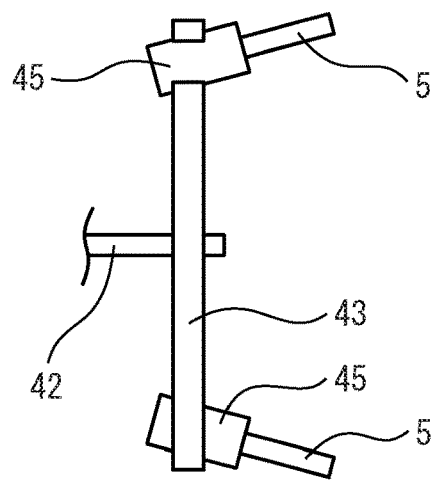
FIG. 18 is a schematic illustration for explaining the rotational moment acting on the tools held by the changing arm.

When the changing arm 43 rotates, rotational moments act on the tools $5_1$ and $5_2$ held by the changing arm 43 around the V-shaped grooves 45a of the tool holders $45_1$ and $45_2$, engaging with the grippers 43a of the changing arm 43, due to the centrifugal forces about the rotary shaft 42. If the tools $5_1$ and $5_2$ are lightweight tools such as a tapping tool (FIG. 5) or a drill (FIG. 6), the center of gravity G is inside the tool holders 45, and therefore the rotational moments are small, and therefore if the changing arm 43 rotates at a high speed, the tools $5_1$ and $5_2$ do not incline during the rotation of the changing arm 43 (FIG. 17). On the other hand, if the tools $5_1$ and $5_2$ are square end mills (FIG. 7) having of which tool lengths L are long, or face mills (FIG. 8) having heavy heads at the end portions, their centers of gravity G are outside the tool holders 45, and therefore relatively large centrifugal forces act on the tools $5_1$ and 52, whereby the tools $5_1$ and $5_2$ incline outwardly during the rotation of the changing arm 43 as shown in FIG. 18. Thus, if the changing arm 43 rotates at a high speed, then the engagements between the gripers 43a and the V-shaped grooves 45a may be released so that the tools $5_1$ and $5_2$ are detached during the rotation of the changing arm 43.

Then, the control device 27 reads the masses and the centers of gravity of the tools $5_1$ and $5_2$ held by the changing arm 43, calculates the rotational moments acting on the tools $5_1$ and $5_2$ by the rotation of the changing arm 43 about the V-shaped grooves 45a of the tool holders 45, and determines the rotational speed as an operation parameter for the changing arm 43, within the range where the engagements between the grippers 43a and by V-shaped grooves 45a are not released. Generally, an unnecessarily low value is selected as the rotational speed of the changing arm 43 so that a tool heaviest in the tools contained in the tool magazine 41 is not disengaged, whereas according to the present embodiment, the rotational speed of the changing arm 43 is optimized, whereby enabling to reduce the time required for the tool change. The rotational speed of the changing arm 43 may be decided based on the mass of the tool. However, it is possible to optimize the rotational speed of the changing arm 43 by determining the rotational speed of the changing arm 43 based on the rotational moments acting on the grippers 43a of the changing arm 43 by the tools 5 and toll holders 45. Alternatively, the operation parameter for the changing arm 43 may be decided by the lowest rotational speed based on both the masses of the tools $5_1$ and $5_2$, and the rotational moment about the V-shaped grooves 45a. The operation parameter may be an angular speed of the changing arm 43 instead of the rotational speed. Further, the operation parameter may be speed or acceleration. The operation parameter based on the speed or the acceleration is suitable for an changing arm which is a linear motion type instead of the rotational motion type. Rotational moments acting on the tools 5 about the V-shaped grooves 45 are generated by the forces based on the gravity force and/or the acceleration and deceleration.

Figure 19:
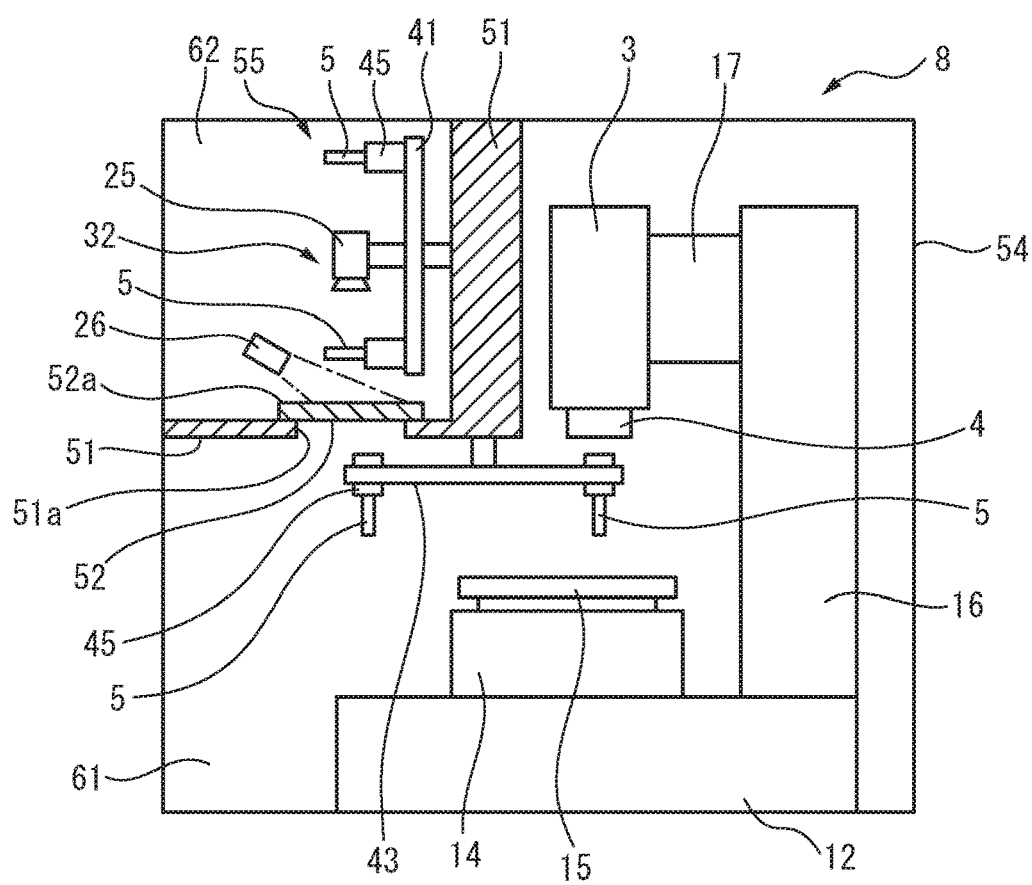
FIG. 19 is a schematic section of a machine tool provided with a tool changer according to another embodiment.

Another embodiment is shown in FIG. 19. The machining tool 1 according to the aforementioned embodiment is a horizontal type in which the spindle 4 extends horizontally. In the present embodiment, a machine tool 8 is a vertical type machine tool. In FIG. 19, the elements similar to those in the aforementioned embodiment are indicated by the same reference numbers.

In FIG. 19, the machine tool 8 is provided with a column 16 disposed on the surface of a bed 12. The column 16 supports a spindle head 3 by a saddle 17. In the example shown in FIG. 19, the saddle 17 is configured to move vertically. A spindle 4, disposed in the spindle head 3, is configured to extend vertically.

The machine tool 8 is provided with a tool changer 55. The tool changer 55 is provided with a tool magazine 41. Tools 5 are held by the tool magazine 41 via tool holders 45. The tool changer 55 includes a tool transferring member movable horizontally between the tool magazine 41 and a changing arm 43. In the tool changer 55, the changing arm 43 extends in a horizontal direction. The changing arm 43 rotates within a horizontal plane. The changing arm 43 detaches a tool 5 from the spindle 4 and attach a tool 5 to the spindle 4. Further, the changing arm 43 detach a tool 5 from the transferring member and attach a tool to the transferring member.

The machine tool 8 has a machining chamber 61 which is enclosed by a splash guard 54. The machining chamber provides a machining space in which a workpiece is machined. A partition wall 61 is formed above the table 14. The machine tool further has a tool storage chamber 62 forming a tool storage space, separated by the partition wall 51, for keeping tools. The partition wall 51 is further provided with a shutter 52 for opening and closing an opening 51*a*. The shutter 52 is arranged so as to horizontally extend. In the machine tool 8, the shutter 52 moves horizontally.

The machine tool 8 is provided with an image capturing device 32. An illumination device 26 is disposed at a side of the shutter 52. A camera 25 captures an image of a tool 5 attached to the tool magazine 41. The camera is disposed so as to capture an image of the tool 5 disposed at a predetermined image capturing position. The image capturing device captures an image of the tool 5 in the way similar to the aforementioned image capturing device 24.

Accordingly, the present invention can also be applied to a vertical type machining tool. Further, the shutter providing a reflector can be arranged to extend in a horizontal direction. Further, the image capturing device may capture an image of a tool held by the tool magazine. The remaining configurations, operations and effects are similar to those of the aforementioned embodiment, and therefore the descriptions therefor are eliminated.

In the aforementioned embodiments can be advantageously combined with each other. In the drawings, the same or equivalent elements are indicated by the same reference sings. In this connection, aforementioned embodiments are examples, and therefore do not limit the invention. Further, the embodiments include a variety of configurations recited in the claims.

REFERENCE SIGNS LIST

1 Machine Tool
5 Tool
24 Image Capturing Device
25 Camera
26 Illumination Device
27 Control Device
32 Image Capturing Device
41 Tool Magazine
43 Changing Arm
43*a* Gripper
52 Shutter
61 Machining Chamber
62 Tool Storage Chamber

The invention claimed is:

1. A tool changing method for a machine tool configured to change a tool by a changing arm between a machining space and a tool storage space that are separated by a partition, the tool changing method comprising:
   an image capturing step of capturing an image of the tool inside the tool storage space with an image capturing device, which includes an imaging device and a light source;
   a calculating step of calculating a length of the tool based on the image captured in the image capturing step;
   a control parameter determining step of determining a control parameter for a mechanical operation occurring with a tool change, based on the length of the tool; and
   a tool changing step of changing the tool between the machining space and the tool storage space by carrying out the mechanical operation occurring with the tool change based on the control parameter; wherein
   the imaging device is oriented within the tool storage space such that during the image capturing step, a longitudinal axis of the imaging device intersects a partition shutter, which opens and closes with respect to the partition, and
   the light source is oriented within the tool storage space such that light emanating from the light source is directed upon a reflective surface of the shutter.

2. The tool changing method of claim 1, wherein the tool changing step includes a shutter opening and closing step, wherein an opening width for the shutter is determined based on the length of the tool as the control parameter for the mechanical operation occurring with the tool change in the control parameter determining step, wherein the shutter is opened to the determined opening width in the shutter opening and closing step.

3. The tool changing method of claim 2, wherein the length of another tool, which is attached to a spindle, and the length of the tool to be changed are compared with each other when a machining process with the another tool is completed, whereby the opening width of the shutter is determined based on the length of the longer one of the another tool and the tool.

4. The tool changing method of claim 1, wherein the tool changing step includes a workpiece retracting step of moving the tool and a workpiece relative to and away from each other, wherein the relative position between the tool and the workpiece where the tool does not interfere with the workpiece during the tool change as the control parameter for the mechanical operation occurring with the tool change based on the length of the tool in the control parameter determining step, wherein the workpiece retracting step includes moving to a determined position.

5. The tool changing method of claim 1, wherein the image of the tool captured during the image capturing step is compared with an image of the tool captured after a machining process, so as to determine whether or not the tool is damaged based on the difference between the two images, whereby an alert is generated and the initiation of a next machining process is abandoned if a damage is found, and the next machining process is started if no damage is found.

6. A machine tool configured to change a tool by a changing arm between a machining space and a tool storage space, the machine tool comprising:
   an image capturing device for capturing an image of the tool inside the tool storage space, the image capturing device having an imaging device and a light source;

a partition that separates the machining space and the tool storage space;

a partition shutter that opens and closes with respect to the partition;

a control device configured to calculate a length of the tool based on the image captured by the image capturing device, to determine a control parameter for a mechanical operation occurring with the tool change, based on the length of the tool, and to control the mechanical operation occurring with the tool change; and a changing arm configured to change the tool between the machining space and the tool storage space, wherein the imaging device is oriented within the tool storage space such that during the capturing of the image, a longitudinal axis of the imaging device intersects the shutter, and the light source is oriented within the tool storage space such that light emanating from the light source is directed upon a reflective surface of the shutter.

7. The machine tool of claim 6, wherein the control device determines an opening width for the shutter based on the length of the tool as the control parameter for the mechanical operation occurring with the tool change, and to control the shutter to open to the determined opening width.

8. The machine tool of claim 7, wherein the control device compares the length of another tool, which is attached to a spindle, and the length of the tool to be changed are when a machining process with the another tool is completed so as to determine the opening width of the shutter based on the length of the longer one of the another tool and the tool.

9. The machine tool of claim 6, wherein the control device determines a shunt position relative to the tool and the workpiece where the tool does not interfere with the workpiece during the tool change as the control parameter for the mechanical operation occurring with the tool change based on the length of the tool, and controls to move the workpiece to the determined shunt position.

10. The machine tool of claim 9, wherein the imaging device captured the image of the tool prior to a machining process, and after said machining process, the imaging device functions to capture an additional image of the tool, and after capturing of the additional image, the control device compares the image and the additional image so as to determine whether or not the tool is damaged based on the difference between the two images, whereby an alert is generated and the initiation of a next machining process is abandoned if a damage is found, and the next machining process is started if no damage is found.

* * * * *